US012288640B2

(12) United States Patent
Hu et al.

(10) Patent No.: US 12,288,640 B2
(45) Date of Patent: Apr. 29, 2025

(54) COIL ELECTRONIC COMPONENT

(71) Applicant: SAMSUNG ELECTRO-MECHANICS CO., LTD., Suwon-si (KR)

(72) Inventors: Tae Ryung Hu, Suwon-si (KR); Yu Jong Kim, Suwon-si (KR); Hye Yeon Jeon, Suwon-si (KR); Young Do Choi, Suwon-si (KR); Jong Min Lee, Suwon-si (KR); Seung Hee Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1038 days.

(21) Appl. No.: 16/597,490

(22) Filed: Oct. 9, 2019

(65) Prior Publication Data

US 2020/0168392 A1 May 28, 2020

(30) Foreign Application Priority Data

Nov. 22, 2018 (KR) ........................ 10-2018-0145451

(51) Int. Cl.
*H01F 27/29* (2006.01)
*H01F 17/00* (2006.01)
(Continued)

(52) U.S. Cl.
CPC ....... *H01F 27/292* (2013.01); *H01F 17/0013* (2013.01); *H01F 27/255* (2013.01);
(Continued)

(58) Field of Classification Search
CPC ............. H01F 17/0013; H01F 27/2804; H01F 2027/2809; H01F 17/0006; H01F 5/003; H01F 27/29; H01F 27/292; H01F 27/255
(Continued)

(56) References Cited

U.S. PATENT DOCUMENTS

2006/0214759 A1* 9/2006 Kawarai ............. H01F 17/0006 336/200
2013/0169399 A1 7/2013 Yoo et al.
(Continued)

FOREIGN PATENT DOCUMENTS

KR 10-2013-0051250 A 5/2013
KR 10-2015-0030687 A 3/2015
(Continued)

OTHER PUBLICATIONS

Korean Office Action dated Feb. 6, 2023, issued in corresponding Korean Patent Application No. 10-2018-0145451 (with English translation).
(Continued)

*Primary Examiner* — Tszfung J Chan
(74) *Attorney, Agent, or Firm* — Morgan, Lewis & Bockius LLP

(57) ABSTRACT

A coil electronic component includes a support substrate, a coil portion disposed on at least one surface of the support substrate, a body in which the support substrate and the coil portion are embedded, and first and second external electrodes disposed on a surface of the body and connected to both ends of the coil portion, respectively. A thickness of the body is 0.55 mm or less. The body includes a cover portion disposed on the coil portion. A ratio of a thickness of the coil portion to a thickness of the cover portion is 5:5 to 8:2.

13 Claims, 5 Drawing Sheets

I-I'

(51) Int. Cl.

| | |
|---|---|
| ***H01F 27/255*** | (2006.01) |
| ***H01F 27/28*** | (2006.01) |
| ***H01F 41/04*** | (2006.01) |
| *H01F 3/10* | (2006.01) |
| *H01F 17/04* | (2006.01) |

(52) U.S. Cl.
CPC ....... *H01F 27/2804* (2013.01); *H01F 41/046* (2013.01); *H01F 2003/106* (2013.01); *H01F 2017/0066* (2013.01); *H01F 2017/048* (2013.01); *H01F 2027/2809* (2013.01)

(58) Field of Classification Search
USPC .................................................. 336/200, 232
See application file for complete search history.

(56) References Cited

U.S. PATENT DOCUMENTS

| | | | | |
|---|---|---|---|---|
| 2013/0300529 | A1* | 11/2013 | Chang | H01F 27/292 336/200 |
| 2015/0109088 | A1* | 4/2015 | Kim | H01F 17/0013 336/200 |
| 2015/0371752 | A1 | 12/2015 | Park et al. | |
| 2016/0086714 | A1* | 3/2016 | Moon | H01F 17/0013 336/200 |
| 2016/0155556 | A1* | 6/2016 | Ohkubo | H01F 41/046 336/83 |
| 2017/0117082 | A1* | 4/2017 | Jeong | H01F 27/255 |
| 2017/0178790 | A1* | 6/2017 | Kim | H01F 17/04 |
| 2018/0033538 | A1 | 2/2018 | Yoon et al. | |
| 2018/0137965 | A1 | 5/2018 | Lee | |
| 2018/0166199 | A1* | 6/2018 | Hachiya | B22F 1/16 |

FOREIGN PATENT DOCUMENTS

| | | | | |
|---|---|---|---|---|
| KR | 10-2015-0068940 A | | 6/2015 | |
| KR | 10-1580399 B1 | | 12/2015 | |
| KR | 10-2017-0088171 A | | 8/2017 | |
| KR | 10-2018-0012618 A | | 2/2018 | |
| KR | 10-2018-0054266 A | | 5/2018 | |
| WO | WO-2016147993 A1 | * | 9/2016 | H01F 17/0013 |
| WO | WO-2017160032 A1 | * | 9/2017 | H01F 17/00 |

OTHER PUBLICATIONS

Office Action issued on Dec. 4, 2023, in the related Korean Patent Application No. 10-2023-0140849 with English translation.

* cited by examiner

COIL ELECTRONIC COMPONENT

CROSS-REFERENCE TO RELATED APPLICATION(S)

This application claims the benefit of priority to Korean Patent Application No. 10-2018-0145451 filed on Nov. 22, 2018 in the Korean Intellectual Property Office, the entire disclosure of which is incorporated herein by reference.

TECHNICAL FIELD

The present disclosure relates to a coil electronic component.

BACKGROUND

As electronic devices such as digital TVs, mobile phones, notebooks, and the like are becoming smaller and thinner, coil electronic components applied to such electronic devices are required to be downsized and thinned. To meet such demand, research into, and development of, various winding type or thin film type coil electronic components are being actively undertaken.

The major issue in miniaturization and thinning of coil electronic components is to implement the same characteristics as those of existing examples, despite such miniaturization and thinning. To satisfy such demand, it is necessary to increase a ratio of the magnetic material in a core filled with a magnetic material, but there is a limit to increasing the ratio of the magnetic material due to the strength of an inductor body and a change in frequency characteristics or the like, depending on the insulation.

In the case of such a coil electronic component, attempts have been made to further reduce a thickness of a chip in accordance with recent changes in the complexity, multi-functionality and slimness of the set. Accordingly, there is a need in the art for a method of ensuring high performance and reliability, even with the trend for slimming of chips.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect of the present disclosure, a coil electronic component may have a low profile satisfying inductance characteristics and stiffness of an inductor, for example, having a thickness smaller than a width.

According to an aspect of the present disclosure, a coil electronic component may include a support substrate, a coil portion disposed on at least one surface of the support substrate, a body in which the support substrate and the coil portion are embedded, and first and second external electrodes disposed on a surface of the body and connected to both ends of the coil portion, respectively. A thickness of the body may be 0.55 mm or less. The body may include a cover portion disposed on the coil portion, and a ratio of a thickness of the coil portion to a thickness of the cover portion may be 5:5 to 8:2, inclusive.

A thickness of the cover portion may be less than a thickness of the coil portion.

The coil portion may be disposed on both of a first surface and a second surface of the support substrate.

A thickness of the coil portion and a thickness of the cover portion may be constant throughout an entire region of the body.

The body may include a magnetic metal powder and an insulating resin.

Materials of the body may be disposed between adjacent turns in the coil portion.

The first and second external electrodes each may include a conductive resin layer disposed on a side surface of the body to be connected to the coil portion.

The conductive resin layer may include at least one of copper (Cu) or nickel (Ni), and may further include a thermosetting resin.

A plating layer may be further disposed on the conductive resin layer.

The thickness of the body in a stacking direction may be 0.55 mm or less, where the stacking direction is a direction in which the coil portion is disposed on the support substrate.

A lead portion may be disposed on an outermost portion of the coil portion and connected to the first and second external electrodes. The lead portion may be formed integrally with the coil portion. A width of the lead portion may be greater than a width of remaining portions of the coil portion.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, examples of the present disclosure will be described in detail with reference to the accompanying drawings so that those skilled in the art may easily carry out the present disclosure.

Figure 1:
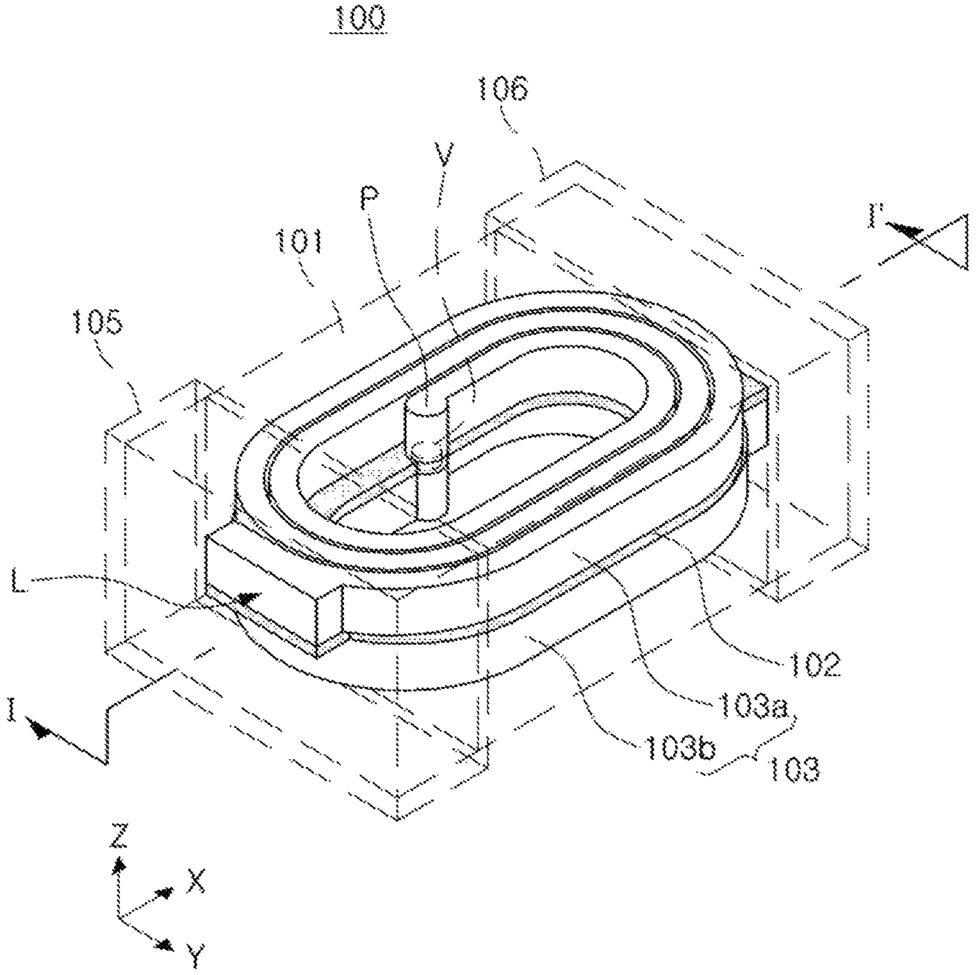
FIG. 1 is a schematic perspective view illustrating a coil electronic component according to an exemplary embodiment of the present disclosure.
Figure 2:
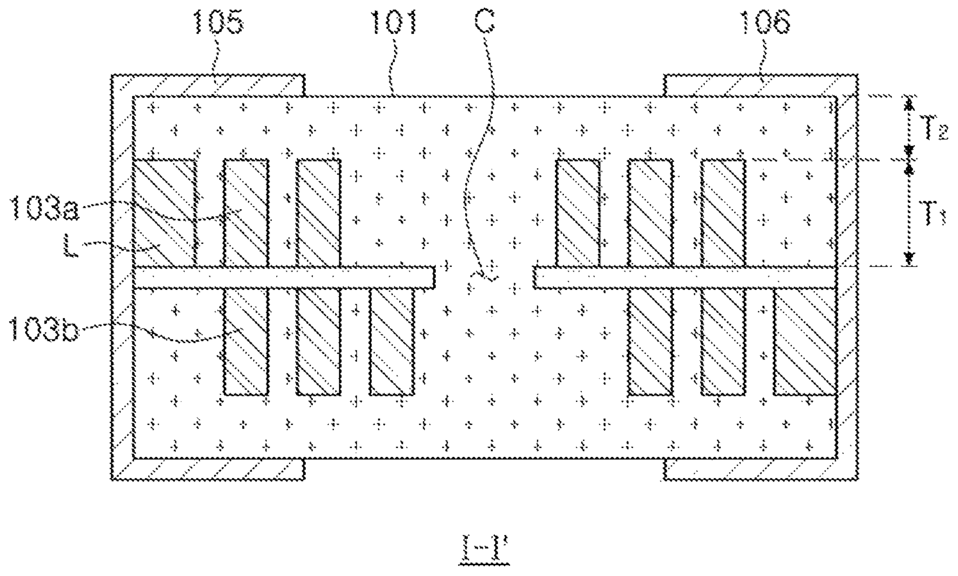
FIG. 2 is a cross-sectional view taken along line I-I' of FIG. 1.

Referring to FIGS. 1 and 2, a coil electronic component 100 according to an exemplary embodiment of the present disclosure includes a body 101, a support substrate 102, a coil portion 103, and external electrodes 105 and 106. A thickness ratio of each of the coil portion and a cover portion is specified to maintain characteristics of a low profile inductor having the thickness of 0.55 mm or less.

The body 101 may form the appearance of the coil electronic component 100 while filling at least a portion of the support substrate 102 and the coil portion 103. According to an exemplary embodiment of the present disclosure, a length of the body 101, for example, the length in the X direction in FIG. 1, may be greater than a thickness, for example, the length in a Z direction in FIG. 1. Further, the thickness of the body 101 may be less than 0.65 mm. The coil electronic component 100 having such a reduced thickness corresponds to a so-called low profile component. In the inductor having the body thickness of 0.65 mm or more, a product that satisfies required characteristics irrespective of a ratio of a thicknesses of a coil portion and a cover portion may be manufactured, while in the case of the low profile coil electronic component 100, durability of an inductor product may be drastically lowered as the thickness of a body thereof is relatively reduced. Therefore, the ratio of the thickness of each of the coil portion and the cover portion should be kept constant throughout an entire portion of the body 101 to implement stable strength and characteristics. According to an exemplary embodiment of the present disclosure, the characteristics are improved by limiting the ratio of thicknesses of the coil portion and the cover portion to a specific numerical range.

On the other hand, the body 101 may be formed in such a manner that a portion of a lead portion L is exposed externally. The body 101 may include metal magnetic powder particles, and an insulating resin may be interposed between the metal magnetic powder particles. In addition, an insulating layer may be coated on surfaces of the metal magnetic powder particles. The metal magnetic powder contained in the body 101 may be ferrite powder, metal powder or the like, and in the case of metal powder, for example, an Fe-based alloy or the like may be used. In detail, as the metal magnetic powder, a nanocrystalline alloy of Fe—Si—B—Cr composition, an Fe—Ni alloy, or the like may be used. For example, the Fe-based alloy particles may have a particle diameter of 0.1 μm or more and 20 μm or less, and may be included in the form of dispersion on a polymer of polyimide or an epoxy resin. When the metal magnetic powder is implemented by the Fe-based alloy as described above, magnetic characteristics such as magnetic permeability are excellent, but the metal magnetic powder may be vulnerable to Electrostatic Discharge (ESD). Thus, an additional insulating structure may be interposed between the coil portion 103 and the metal magnetic powder. Also, as illustrated in the drawings, the body 101 may fill a region between adjacent turns and turns in the coil portion 103.

The support substrate 102 supports the coil portion 103. As the support substrate 102, a polypropylene glycol (PPG) substrate, a ferrite substrate or a metal-based soft magnetic substrate or the like may be used. A through-hole C may be formed by penetrating through a central portion of the support substrate 102, and may be filled with the body 101 to form a magnetic core portion.

The coil portion 103 is disposed on at least one of a first surface (for example, an upper surface in FIG. 2) and a second surface (for example, a lower surface in FIG. 2) of the support substrate 102, the first and second surfaces opposing each other. According to an exemplary embodiment of the present disclosure, a first coil portion 103*a* is disposed on the first surface of the support substrate 102, and a second coil portion 103*b* is disposed on the second surface, so that the coil portions are disposed on both surfaces of the support substrate 102. According to another exemplary embodiment of the present disclosure, a coil portion may be disposed on only one surface. The first and second coil portions 103*a* and 103*b* may include a pad region P, and may be connected to each other by a via V penetrating through the support substrate 102. The coil portion 103 may be formed by a plating process used in the art, for example, a pattern plating process, an anisotropic plating process, an isotropic plating process or the like, or may also be formed to have a multilayer structure, using a plurality of processes among these processes.

The external electrodes 105 and 106 are disposed on external surfaces of the body 101 to be connected to lead portions L. The external electrodes 105 and 106 may include a conductive resin layer disposed on a side surface of the body to be connected to the coil portion. The conductive resin layer may include one or more selected from the group consisting of copper (Cu) and nickel (Ni), and a thermosetting resin. The thermosetting resin may be a polymer resin such as an epoxy resin, polyimide or the like, but is not limited thereto. Further, a plating layer may be further formed on the external electrodes 105 and 106. In this case, the plating layer may include one or more selected from the group consisting of nickel (Ni), copper (Cu), and tin (Sn). For example, a nickel layer and a tin layer may be sequentially formed on the external electrodes 105 and 106.

The lead portion L may be disposed on an outermost portion of the coil portion 103 to provide a connection path to be connected to the external electrodes 105 and 106, and may be formed integrally with the coil portion 103. In this case, the lead portion L may be formed to have a wider width than that of the coil portion 103, for connection to the external electrodes 105 and 106 as illustrated in the drawings. In this case, the width refers to the width in the X direction with reference to FIG. 1.

For example, when an area disposed on the coil portion 103 located on at least one surface of the support substrate 102 is referred to as a cover portion, a thickness $T_2$ of the cover portion may be less than a thickness $T_1$ of the coil portion 103. The thicknesses of the cover part and the coil portion 103 according to one aspect of the present disclosure may refer to thicknesses of the first coil portion 103*a* and an upper cover portion disposed thereon, or the second coil portion 103*b* and a lower cover portion disposed therebelow. The first coil portion 103*a* and the upper cover portion are symmetrically formed with the second coil portion 103*b* and the lower cover portion. The thickness $T_2$ of the cover portion refers to the thickness of the upper cover portion covering the first coil portion 103*a* or the thickness of the lower cover portion covering the second coil portion 103*b*. In addition, in a low profile inductor in which a thickness of the body 101 is 0.55 mm or less, the ratio of the thickness $T_1$ of the coil portion 103 and the thickness $T_2$ of the cover portion may satisfy the ratio of 5:5 to 8:2. Thus, by limiting the ratio of the thicknesses of the coil portion 103 and the cover portion to a specific numerical value range, strength and characteristics of a product may be implemented in a low profile inductor.

On the other hand, according to an exemplary embodiment of the present disclosure, a coil electronic component was manufactured under the following conditions, and strength (BDV evaluation) depending on the thickness ratio of the coil portion 103 and the cover portion was measured. The ratio of the thickness of the coil portion 103 and the cover portion, in which the strength and inductance characteristics of a product may be implemented, was measured in three kinds of inductors having thicknesses of 1.0 mm, 0.65 mm and 0.55 mm, respectively. In detail, in a low profile inductor having a body thickness of 0.55 mm or less, a ratio of a case in which the BDV value was high was specified.

Figure 3:
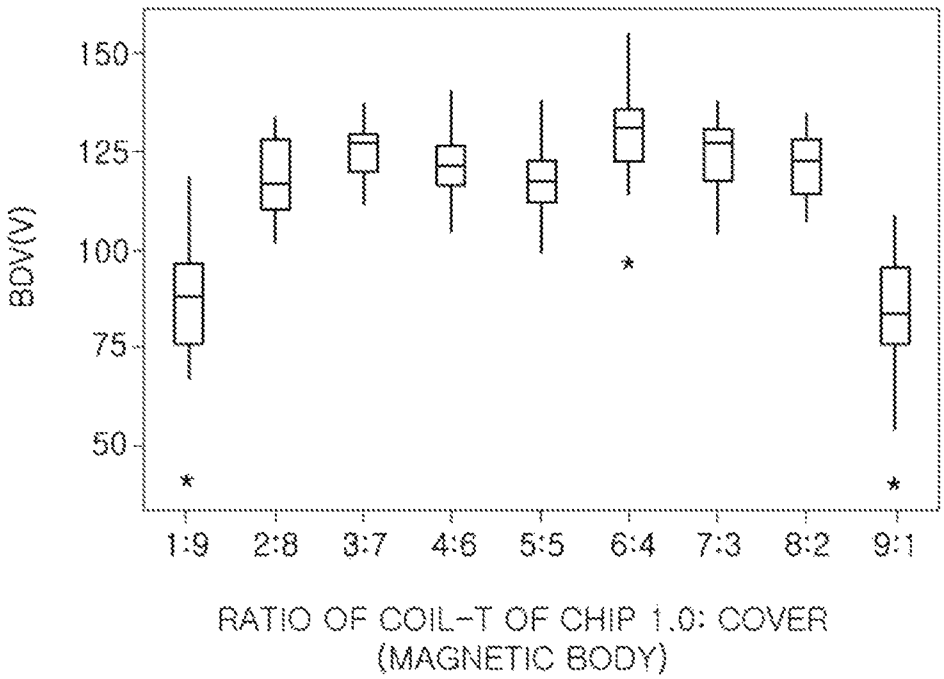
FIG. 3 is a graph illustrating BDV evaluation (high withstand voltage characteristics) results according to a ratio of a coil portion and a cover portion of an inductor in which a body has a thickness of 1.0 mm.
Figure 4:
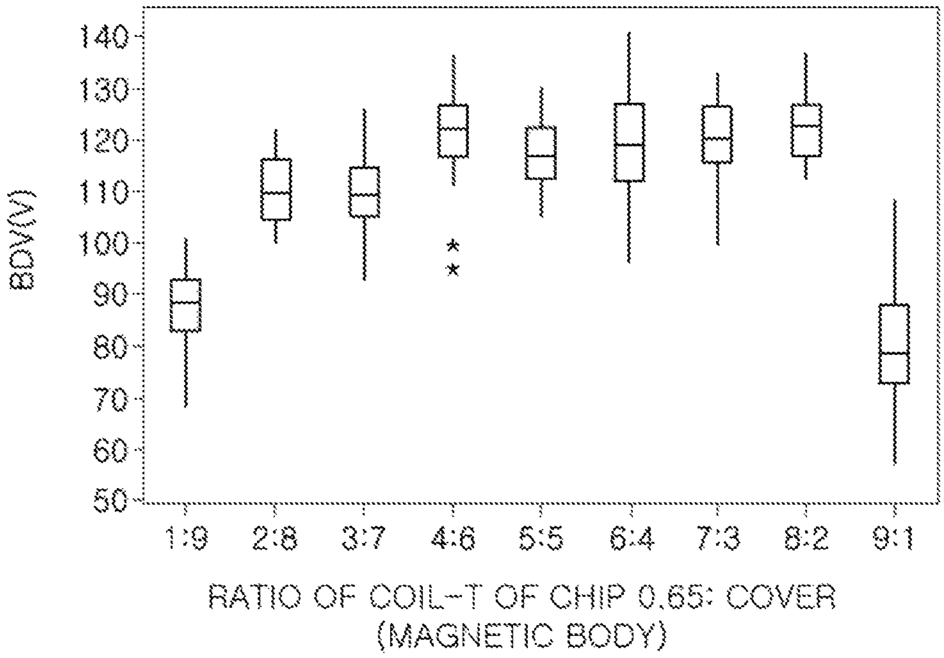
FIG. 4 is a graph illustrating BDV evaluation (high withstand voltage characteristics) results according to a ratio of a coil portion and a cover portion of an inductor in which a body has a thickness of 0.65 mm.
Figure 5:
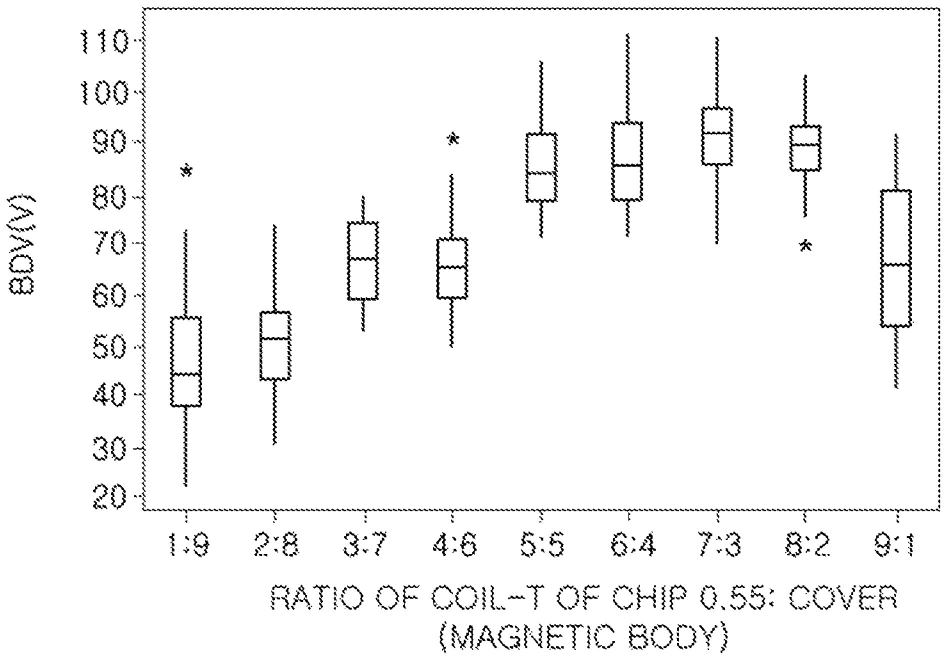
FIG. 5 is a graph illustrating BDV evaluation (high withstand voltage characteristics) results according to a ratio of a coil portion and a cover portion of an inductor in which a body has a thickness of 0.55 mm.

FIGS. 3, 4, and 5 are graphs illustrating results of BDV evaluation (high withstand voltage characteristics) depending on the ratios of coil portions 103 and cover portions of inductors in which body thicknesses are 1.0 mm, 0.65 mm and 0.55 mm, respectively.

Referring to FIGS. 3 and 4, when the body thickness is 0.65 mm or more, the ratio of thicknesses of the coil portion 103 and the cover portion maintains stable strength of the inductors at all ratios except for 1:9 and 9:1. It can be confirmed that, since the volume of the body is relatively large, an influence of the ratio of thicknesses of the coil portion 103 and the cover portion is low.

Referring to FIG. 5, in an inductor having a body thickness of 0.55 mm or less, when the ratio of thicknesses of the coil portion 103 and the cover portion is maintained between 5:5 and 8:2, an inductor having high strength and stable characteristics may be manufactured.

As a result of comparing the above-mentioned implemented components, compared with the case of using an inductor with a body thickness of 0.65 mm or more, the ratio of thicknesses of the coil portion 103 and the cover portion is maintained between 5:5 and 8:2 in the case in which the body thickness is 0.55 mm or less, and thus, the BDV value of about 100 may be secured, thereby maintaining inductor stiffness. As a result, by using an inductor having the coil portion 103 and the cover portion satisfying the ratios proposed in exemplary embodiments of the present disclosure, a miniaturized inductor may be implemented while improving stiffness and inductance characteristics as compared with an inductor of the related art.

As set forth above, in the case of a coil electronic component according to exemplary embodiments of the present disclosure, inductance characteristics and stiffness of an inductor may be satisfied even when a thickness of the coil electronic component is reduced.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil electronic component comprising:
- a support substrate;
- a coil portion disposed on at least one surface of the support substrate;
- a body in which the support substrate and the coil portion are embedded; and
- first and second external electrodes disposed on a surface of the body and connected to both ends of the coil portion, respectively,
- wherein a thickness of the body is 0.55 mm or less,
- wherein the body includes a cover portion disposed on the coil portion, and a ratio of a thickness of the coil portion to a thickness of the cover portion is more than 6:2 and less than or equal to 8:2, wherein the thickness of the cover portion is measured from an upper surface of the body to an upper surface of the coil portion, or measured from a lower surface of the body to a lower surface of the coil portion, and
- wherein the thickness of the coil portion is larger than a width of the coil portion and is larger than a thickness of the support substrate.

2. The coil electronic component of claim 1, wherein the coil portion is disposed on both of a first surface and a second surface of the support substrate.

3. The coil electronic component of claim 1, wherein the thickness of the coil portion and the thickness of the cover portion are constant throughout an entire region of the body.

4. The coil electronic component of claim 1, wherein the body comprises a magnetic metal particle and an insulating resin.

5. The coil electronic component of claim 1, wherein the first and second external electrodes each comprise a conductive resin layer disposed on a side surface of the body to be connected to the coil portion.

6. The coil electronic component of claim 5, wherein the conductive resin layer comprises at least one of copper (Cu) or nickel (Ni), and further comprises a thermosetting resin.

7. The coil electronic component of claim 5, wherein a plating layer is further disposed on the conductive resin layer.

8. The coil electronic component of claim 7, wherein the plating layer is a layer in which a nickel (Ni) layer and a tin (Sn) layer are sequentially disposed.

9. The coil electronic component of claim 1, wherein the thickness of the body in a stacking direction is 0.55 mm or less, where the stacking direction is a direction in which the coil portion is disposed on the support substrate.

10. The coil electronic component of claim 1, wherein a lead portion is disposed on an outermost portion of the coil portion and is connected to one of the first and second external electrodes,
- the lead portion is formed integrally with the coil portion, and
- a width of the lead portion is greater than a width of remaining portions of the coil portion.

11. The coil electronic component of claim 1, wherein the body includes metal magnetic particles and an insulating resin, and
- the insulating resin of the body is interposed between the magnetic metal particles.

12. The coil electronic component of claim 11, wherein an insulating layer is coated on surfaces of the metal magnetic particles.

13. The coil electronic component of claim 11, wherein the metal magnetic particles include an Fe-based alloy having a particle diameter of 0.1 μm or more and 20 μm or less.

* * * * *